US010904752B2

(12) United States Patent
Kim et al.

(10) Patent No.: US 10,904,752 B2
(45) Date of Patent: Jan. 26, 2021

(54) METHOD FOR ALLOCATING TERMINAL IDENTIFIER IN DISTRIBUTED ANTENNA COMMUNICATION SYSTEM AND DEVICE FOR SAME

(71) Applicant: LG ELECTRONICS INC., Seoul (KR)

(72) Inventors: Heejin Kim, Seoul (KR); Jiwon Kang, Seoul (KR); Heejeong Cho, Seoul (KR); Genebeck Hahn, Seoul (KR); Ilmu Byun, Seoul (KR); Hyunjin Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 99 days.

(21) Appl. No.: 16/099,972

(22) PCT Filed: Jan. 12, 2017

(86) PCT No.: PCT/KR2017/000405
§ 371 (c)(1),
(2) Date: Nov. 8, 2018

(87) PCT Pub. No.: WO2017/204435
PCT Pub. Date: Nov. 30, 2017

(65) Prior Publication Data
US 2019/0149988 A1 May 16, 2019

Related U.S. Application Data

(60) Provisional application No. 62/342,213, filed on May 27, 2016.

(51) Int. Cl.
*H04W 12/06* (2009.01)
*H04B 7/0404* (2017.01)
(Continued)

(52) U.S. Cl.
CPC .......... *H04W 12/06* (2013.01); *H04B 7/0404* (2013.01); *H04B 7/0617* (2013.01);
(Continued)

(58) Field of Classification Search
None
See application file for complete search history.

(56) References Cited

U.S. PATENT DOCUMENTS

| 2006/0046639 A1 | 3/2006 | Walker et al. |
| 2010/0234071 A1 | 9/2010 | Shabtay et al. |
| (Continued) | | |

FOREIGN PATENT DOCUMENTS

| CN | 103385026 | 11/2013 |
| CN | 203523044 | 4/2014 |
| (Continued) | | |

OTHER PUBLICATIONS

European Patent Office Application Serial No. 17802954.2, Search Report dated Oct. 17, 2019, 6 pages.

(Continued)

*Primary Examiner* — Brandon S Hoffman
(74) *Attorney, Agent, or Firm* — Lee, Hong, Degerman, Kang & Waimey PC

(57) ABSTRACT

Disclosed is a method for a terminal, which comprises a plurality of distributed antenna units, transmitting and receiving a signal in a wireless communication system. More particularly, the method comprises the steps of 1) performing a first random access procedure with a first cell by means of a first distributed antenna unit group and performing a second random access procedure with a second cell by means of a second distributed antenna unit group; 2) transmitting, to the first cell and the second cell, information about the distributed antenna units comprised in the corresponding antenna unit groups; and 3) performing an authorization procedure with the first cell by means of the first distributed antenna unit group and transmitting an authorization procedure skip request signal to the second cell by means of the second distributed antenna unit group.

8 Claims, 13 Drawing Sheets

(51) Int. Cl.
   H04B 7/06     (2006.01)
   H04W 76/15    (2018.01)
   H04B 7/08     (2006.01)
   H04W 74/08    (2009.01)
   H04B 7/024    (2017.01)
   H04W 88/02    (2009.01)

(52) U.S. Cl.
   CPC ........ H04B 7/086 (2013.01); H04W 74/0833 (2013.01); H04W 76/15 (2018.02); *H04B 7/024* (2013.01); *H04W 88/02* (2013.01)

(56) References Cited

U.S. PATENT DOCUMENTS

| | | | |
|---|---|---|---|
| 2012/0113948 A1* | 5/2012 | Kwon | H04L 5/0053 370/329 |
| 2012/0275445 A1 | 11/2012 | Karlsson | |
| 2013/0007858 A1* | 1/2013 | Shah | H04L 63/0815 726/6 |
| 2013/0343256 A1 | 12/2013 | Zakrzewski | |
| 2015/0092717 A1 | 4/2015 | Seo et al. | |
| 2016/0057800 A1 | 2/2016 | Ingale et al. | |
| 2016/0105539 A1 | 4/2016 | Maddox et al. | |

FOREIGN PATENT DOCUMENTS

| | | |
|---|---|---|
| CN | 104247530 | 12/2014 |
| KR | 1020110112582 | 10/2011 |
| KR | 1020150067155 | 6/2015 |

OTHER PUBLICATIONS

PCT International Application No. PCT/KR2017/000405, Written Opinion of the International Searching Authority dated May 12, 2017, 15 pages.

The State Intellectual Property Office of the People's Republic of China Application Serial. No. 201780031201.X, Office Action dated Sep. 27, 2020, 6 pages.

* cited by examiner (A) CONTROL-PLANE PROTOCOL STACK (B) USER-PLANE PROTOCOL STACK (a)  (b)

Where CRC of each RU can be scrambled by C-RNTI

METHOD FOR ALLOCATING TERMINAL IDENTIFIER IN DISTRIBUTED ANTENNA COMMUNICATION SYSTEM AND DEVICE FOR SAME

CROSS-REFERENCE TO RELATED APPLICATIONS

This application is the National Stage filing under 35 U.S.C. 371 of International Application No. PCT/KR2017/000405, filed on Jan. 12, 2017, which claims the benefit of U.S. Provisional Application No. 62/342,213, filed on May 27, 2016, the contents of which are all hereby incorporated by reference herein in their entirety.

TECHNICAL FIELD

The present invention relates to a wireless communication system, and more particularly, to a method for allocating a UE identifier in a distributed antenna communication system and a device for the same.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

Based on the aforementioned discussion, an object of the present invention is to provide a method for allocating a UE identifier in a distributed antenna communication system and a device for the same.

Technical Solution

A method for a user equipment (UE), which comprises a plurality of distributed antenna units, transmitting and receiving a signal in a wireless communication system according to one aspect of the present invention comprises the steps of performing a first random access procedure with a first cell by means of a first distributed antenna unit group of the plurality of distributed antenna units and performing a second random access procedure with a second cell by means of a second distributed antenna unit group of the plurality of distributed antenna units; transmitting, to the first cell, information on the distributed antenna units included in the first distributed antenna unit group and transmitting, to the second cell, information on the distributed antenna units included in the second distributed antenna unit group; performing an authentication procedure with the first cell by means of the first distributed antenna unit group and transmitting an authentication procedure skip request signal to the second cell by means of the second distributed antenna unit group; and transmitting and receiving the signal through the first cell and the second cell by means of the first distributed antenna unit group and the second distributed antenna unit group.

Meanwhile, a user equipment (UE) in a wireless communication system according to another aspect of the present invention comprises a plurality of distributed antenna units; and a central unit for controlling the distributed antenna units, wherein the central unit performs a first random access procedure with a first cell by means of a first distributed antenna unit group of the plurality of distributed antenna units and performs a second random access procedure with a second cell by means of a second distributed antenna unit group of the plurality of distributed antenna units, transmits, to the first cell, information on the distributed antenna units included in the first distributed antenna unit group and transmits, to the second cell, information on the distributed antenna units included in the second distributed antenna unit group, performs an authentication procedure with the first cell by means of the first distributed antenna unit group and transmits an authentication procedure skip request signal to the second cell by means of the second distributed antenna unit group, and transmits and receives a signal through the first cell and the second cell by means of the first distributed antenna unit group and the second distributed antenna unit group.

Preferably, the authentication procedure skip request signal may include a sharing request signal of authentication performed with the first cell. Also, the information on the distributed antenna units included in the first distributed antenna unit group and the information on the distributed antenna units included in the second distributed antenna unit group may include identification information of the distributed antenna units.

Additionally, a first UE identifier for the first distributed antenna unit group is received from the first cell through the first random access procedure, and a second UE identifier for the second distributed antenna unit group is received from the second cell through the second random access procedure.

More preferably, the UE selects the first distributed antenna unit group for accessing the first cell and the second distributed antenna unit group for accessing the second cell from the plurality of distributed antenna units based on a result of radio resource measurement.

Advantageous Effects

According to the embodiment of the present invention, control information may be transmitted more efficiently through allocation a UE identifier in a distributed antenna communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE FOR CARRYING OUT THE INVENTION

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

Figure 1:
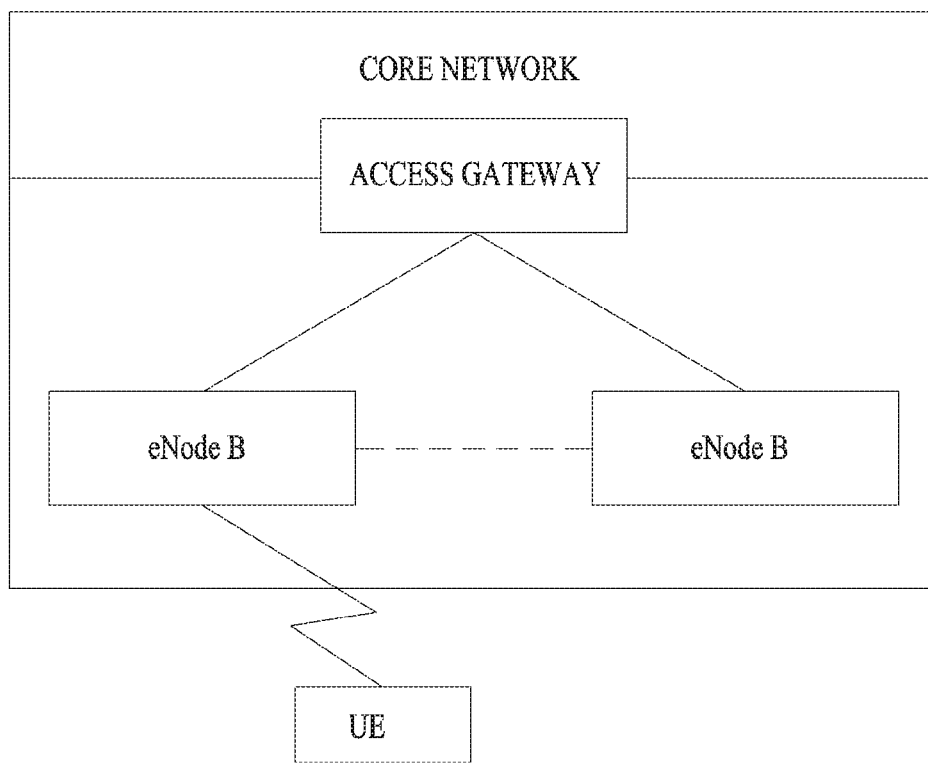
FIG. 1 is a diagram schematically illustrating a network structure of an E-UMTS as an exemplary radio communication system.
Figure 2:
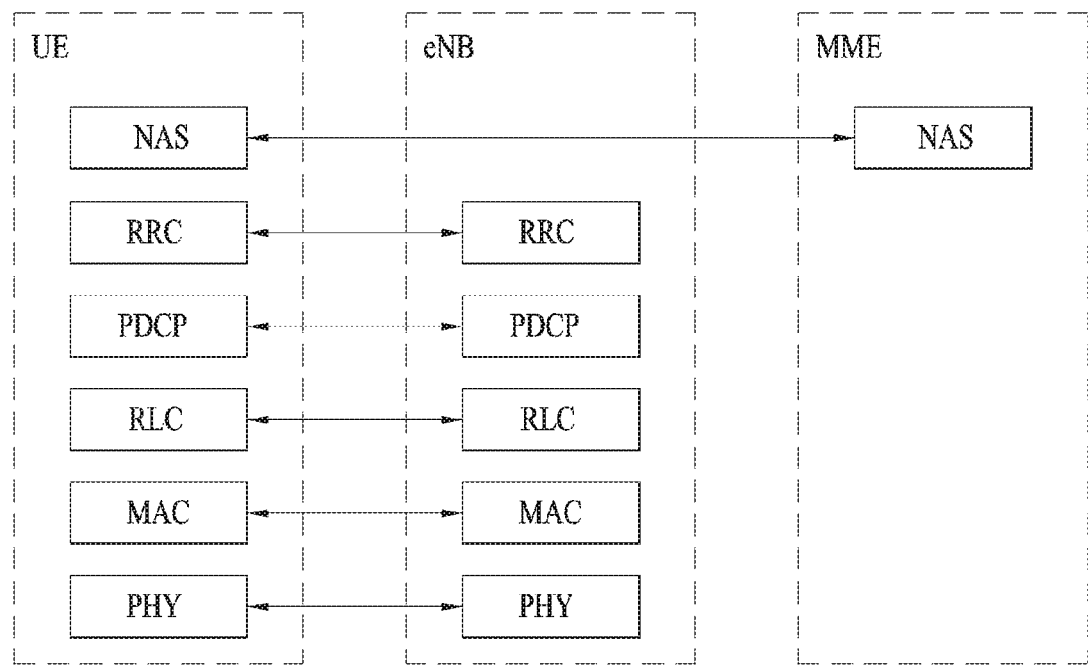
FIG. 2 is a diagram illustrating structures of a control plane and a user plane of a radio interface protocol between a UE and an E-UTRAN based on the 3GPP radio access network specification.
Figure 2:
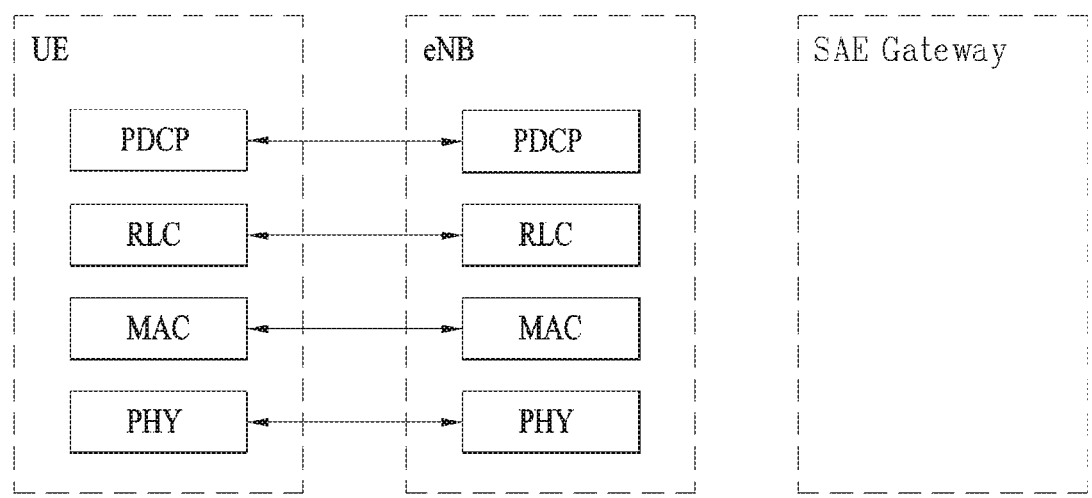

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

One cell constituting an eNB provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells may be configured to provide corresponding bandwidths, respectively.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
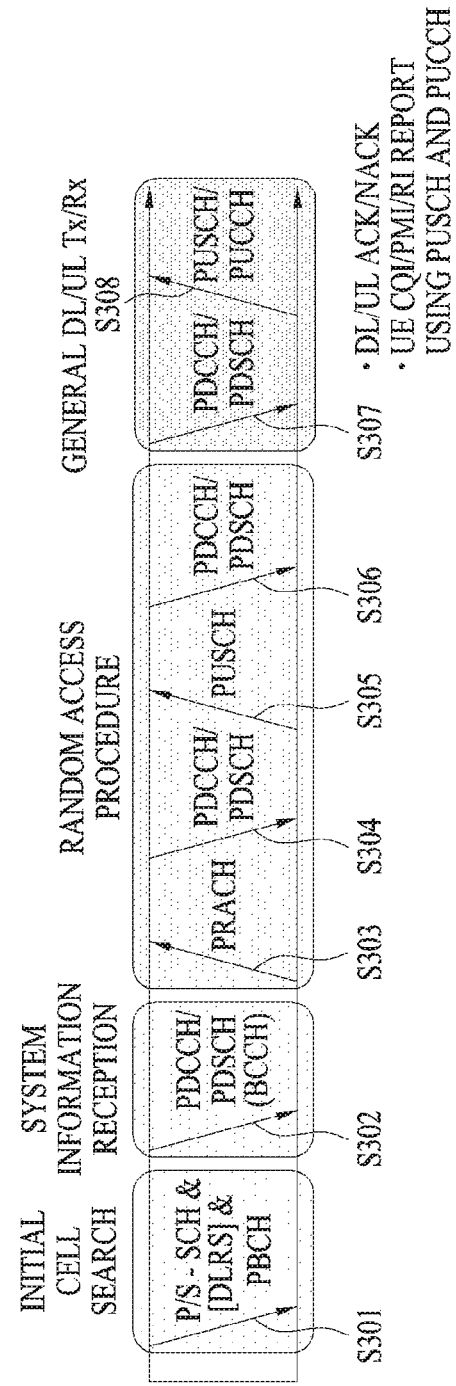
FIG. 3 is a diagram illustrating physical channels used in a 3GPP system and a general signal transmission method using the same.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
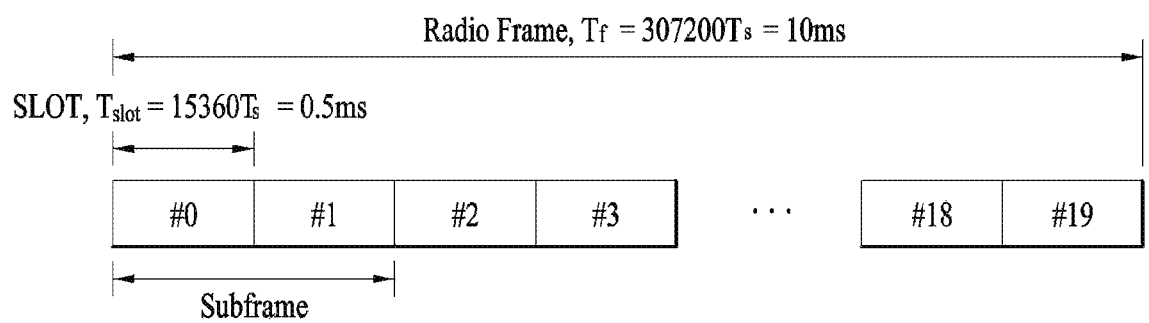
FIG. 4 is a diagram illustrating the structure of a radio frame used in an LTE system.

FIG. 4 illustrates a structure of a radio frame used in the LTE system.

Referring to FIG. 4, a radio frame is 10 ms (327200×$T_s$) long and divided into 10 equal-sized subframes. Each subframe is 1 ms long and further divided into two slots. Each time slot is 0.5 ms (15360×$T_s$) long. Herein, $T_s$ represents a sampling time and $T_s=1/(15 \text{ kHz}\times 2048)=3.2552\times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
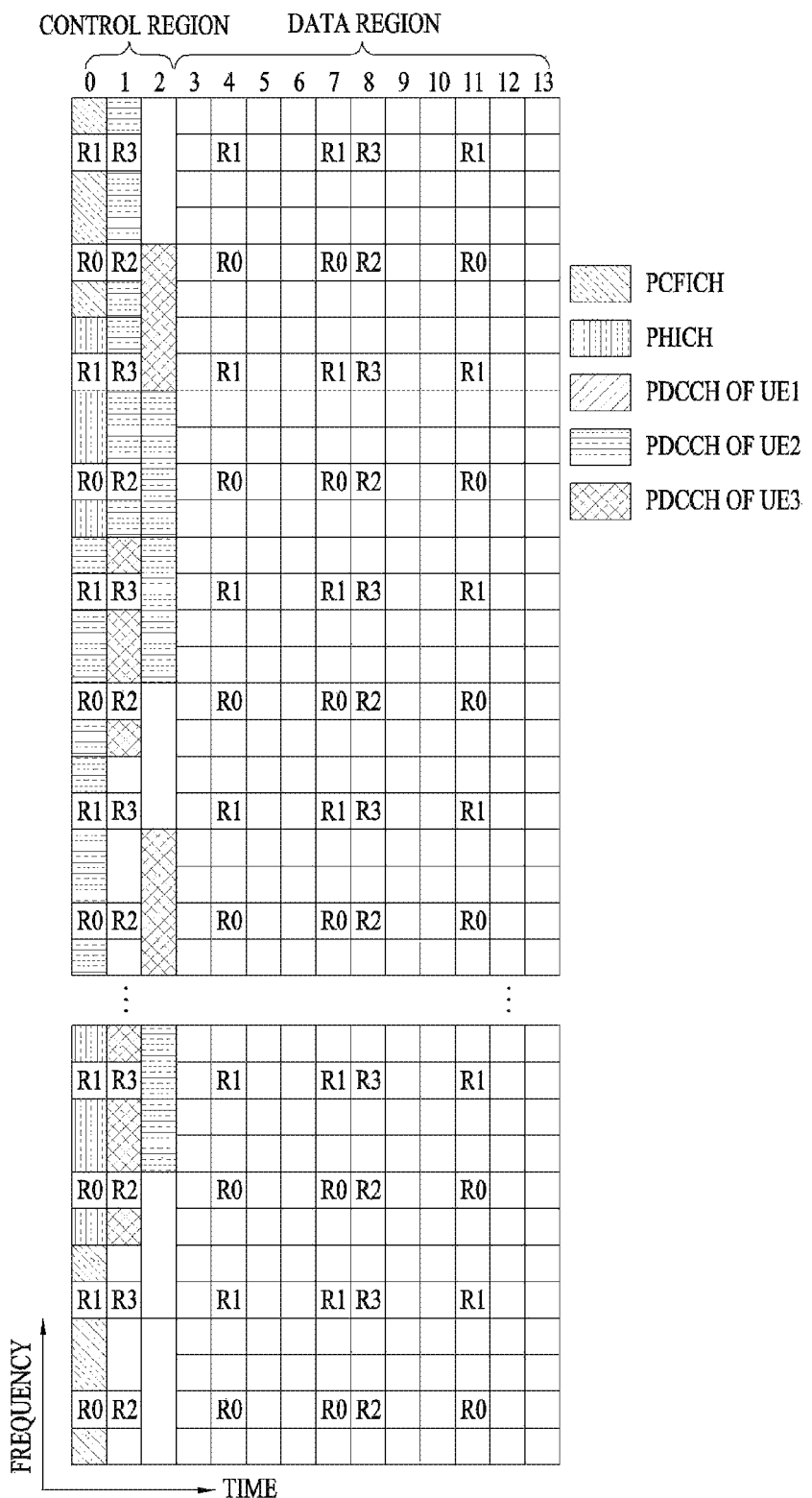
FIG. 5 is a diagram illustrating the structure of a DL radio frame used in an LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH.

The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
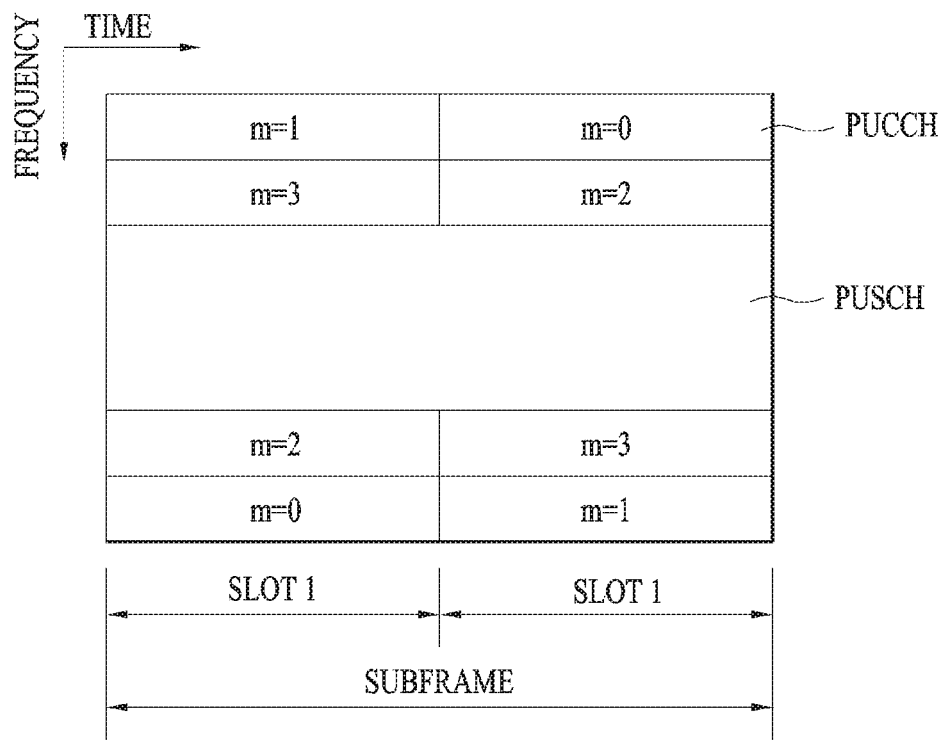
FIG. 6 is a diagram illustrating the structure of a UL subframe in an LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 7:
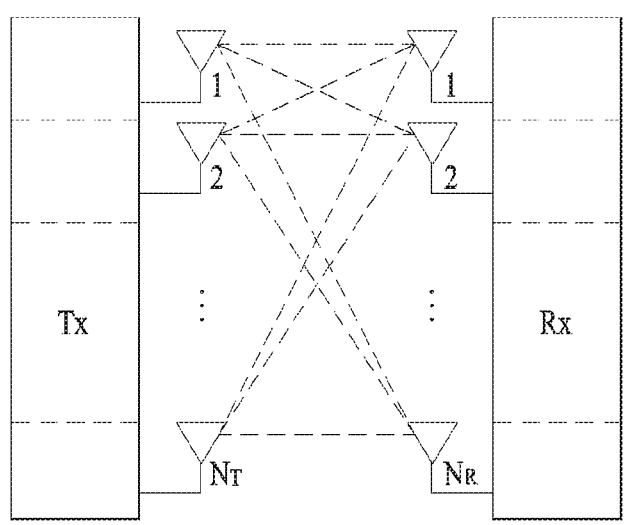
FIG. 7 illustrates the configuration of a typical MIMO communication system.

FIG. 7 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Hereinafter, a communication system between vehicles based on the above-described wireless communication system will be described.

Figure 8:
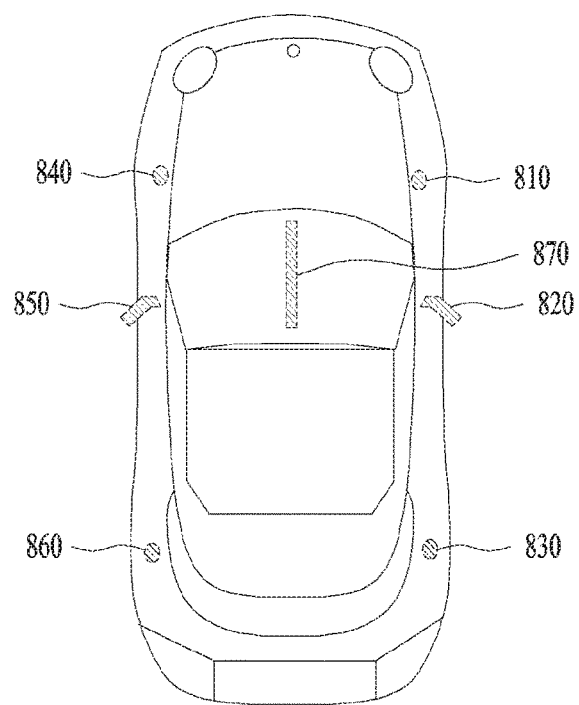
FIG. 8 is a diagram illustrating a vehicle comprising a plurality of antenna arrays.
Figure 8:
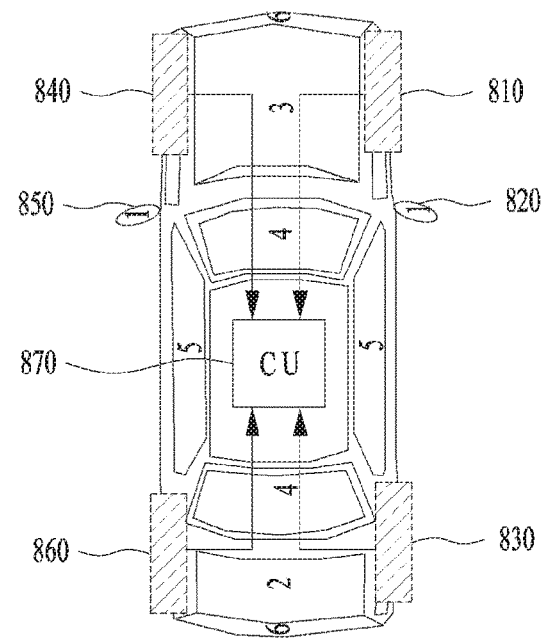

FIG. 8 is a diagram illustrating a vehicle comprising a plurality of antenna arrays. Usage frequency and usage service range of the aforementioned wireless communication system are increasing. In this case, unlike the legacy static service, needs for supporting a high Quality of Service (QoS) as well as high data throughput or high data rate are increased for a UE or user which(who) moves at high speed.

For example, in the wireless communication system, the needs to support radio services of good quality for UEs which are moving are increased, wherein examples of the radio services include a case that a plurality of UEs or users (hereinafter, referred to as UEs), which use public transportation, desire to view multimedia while riding a vehicle, or a case that a plurality of UEs which have rode a personal vehicle travelling a highway use their respective radio communication services different from each other.

However, the legacy wireless communication system may have a limitation in providing services to UEs considering high speed movement or mobility. At this time, for service support, the system network is required to be improved to a revolution level. Also, a new system design may be required within the range that does not affect the legacy network infrastructure while maintaining compatibility with the legacy network infrastructure.

For example, a large sized antenna array may be installed in a vehicle to allow the vehicle to acquire a large array gain, whereby UEs inside the vehicle may be supported by good quality of services even in the case that the vehicle is moving at high speed. Data received through a central unit (CU) may be relayed to the UEs inside the vehicle. At this time, if the large sized antenna array is used, the vehicle may prevent communication throughput from being deteriorated by penetration loss having an average value of 20 dB, approximately. Also, since the vehicle uses Rx antennas more than the number of UEs which use the system, the large array gain may easily be acquired, and Rx diversity may be acquired through a distance obtained between Rx antennas. That is, services may be provided to UEs, which are moving at high speed, through the aforementioned MIMO system between vehicles without additional design of the network.

However, in spite of the aforementioned advantages, a problem occurs in that it is difficult to apply the MIMO system between the vehicles due to reasons of external appearance of the vehicle and production system construction. Also, the vehicle is a very expensive equipment compared with the legacy personal portable communication device, and may not be improved and updated easily. Also, since the vehicle should satisfy more requirements such as design concept and aerodynamic structure in addition to communication throughput, vehicle design may be restricted in view of esthetic appearance/aerodynamic aspects. For example, some of vehicle manufacturers use combined antennas, of which throughput is deteriorated as compared with a single antenna, to remove visual inconvenience of the current antenna.

However, to solve a spatial restriction of a large sized antenna array in an environment where the development and need of the communication system has been issued, vehicle installation of a distributed antenna array system for implementation of a plurality of antenna array systems is gradually introduced, and is applied considering balance with external appearance of the vehicle.

Figure 10:
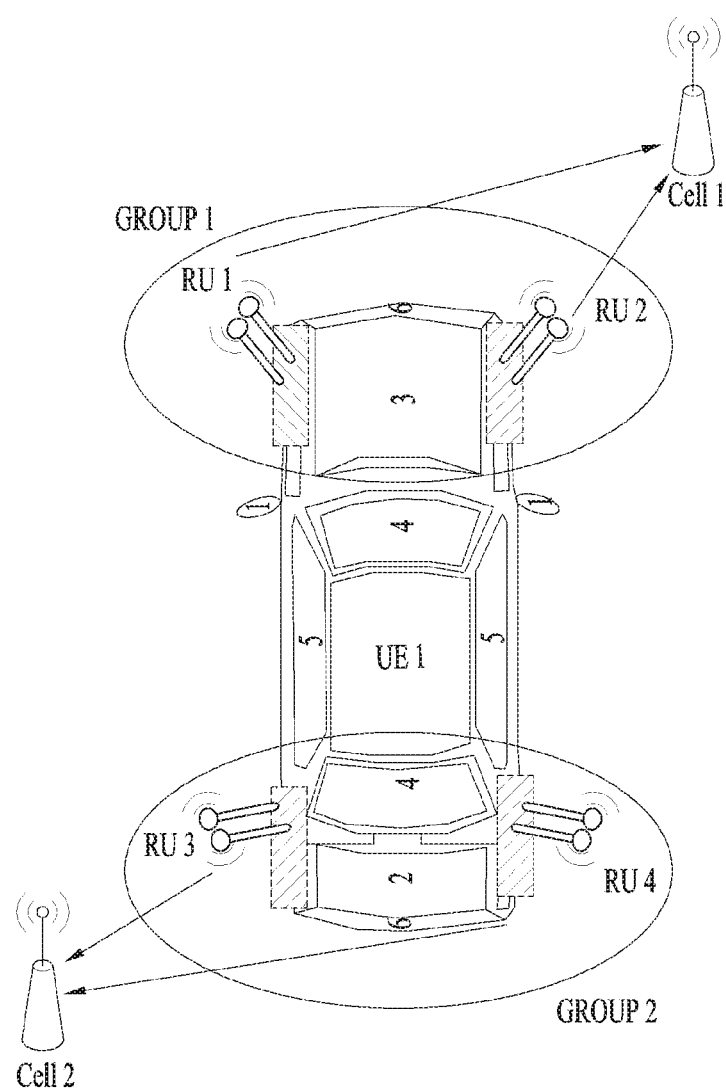
FIG. 10 is a diagram illustrating a status that a vehicle distributed antenna UE performs an initial access procedure in accordance with the first embodiment of the present invention.

For example, referring to FIG. 10, a plurality of antennas 810, 820, 830, 840, 850, and 860 may be installed in the vehicle. At this time, the position and the number of the plurality of antennas 810, 820, 830, 840, 850, and 860 may be varied depending on a vehicle design system and each vehicle. The following configuration may equally be applied even though the position and the number of the plurality of antennas 810, 820, 830, 840, 850, and 860 installed in the vehicle are changed, and is not limited to the following embodiment. That is, the following configuration may be applied to antennas having various shapes and radiation patterns according to the position of the plurality of antennas 810, 820, 830, 840, 850, and 860.

At this time, a signal of distributed antenna units (DUs) or remote units (RUs) distributed in each of the vehicles may be controlled through a central unit (CU) 870. That is, the CU 870 of the vehicle may receive a signal from the eNB while maximizing Rx diversity by controlling the signal of the RUs 810, 820, 830, 840, 850, and 860 installed in the vehicle, and may allow radio access between the eNB and the vehicle not to be disconnected in a status that the eNB and the vehicle are moving at high speed. That is, the vehicle may be a UE having a plurality of antennas or a relay UE that relays a signal. The vehicle may provide a plurality of UEs in the vehicle with good quality of service through control and relay of the signal received through the CU 870.

Generally, in communication, the UE comprises RRH, which includes a radio frequency (RF) and analog digital converter (ADC)/digital analog converter (DAC), a modem (including PHY, MAC, RLC, PDCP, RRC, and NAS), and an application processor (AP) in view of functional/hierarchical aspect. In the vehicle distributed antenna system, a function of a portion titled a DU has no reason for limitation to a role of an antenna (RF or RRH) module of functions/layers of the UE. This is because that some of the functions of the UE as well as the function of the RF module may additionally be given to each DU to perform a specific processing and the signal subjected to processing is delivered from the DU to the CU to enable combing processing. Therefore, the vehicle antenna system may lower RF implementation technical level (in accordance with a DU-CU implementation scenario) by appropriately distributing and allocating the functional/hierarchical modules of the UE to the DU and the CU, or may obtain implementation gain by solving a DU-CU cabling issue.

Figure 9:
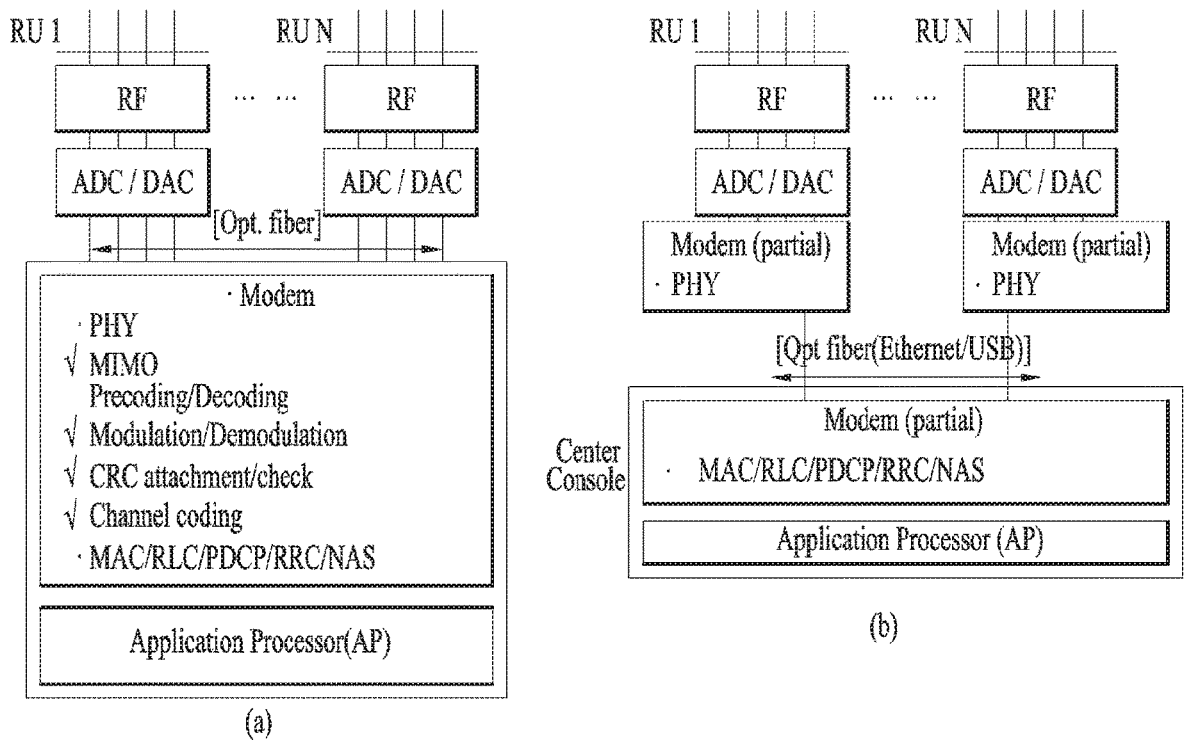
FIG. 9 is a diagram illustrating an example of function sharing between a DU and a CU in a vehicle MIMO system.
Figure 9:
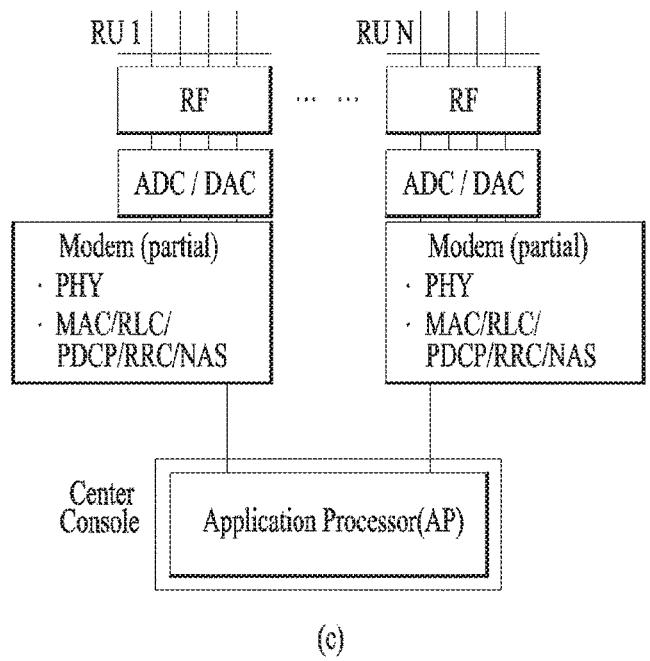

FIG. 9 is a diagram illustrating an example of function sharing between a DU and a CU in a vehicle MIMO system.

Particularly, (a) of FIG. 9 may easily be implemented by RU function simplification, and is characterized in that its implementation is available by means of reuse of a function of the existing modem. Also, in an implementation scenario according to distribution of the functional/hierarchical modules between the RU and the CU, examples in implementation of a minimum function of a modem in each DU, for example, a function of a physical (PHY) layer are illustrated in (b) and (c) of FIG. 9.

Particularly, since a physical layer operation is performed per RU in (b) and (c) of FIG. 9, a system operation for providing control information including individual uplink grant/downlink grant for each RU and restoring data for each RU may be performed. At this time, the eNB needs to know that the corresponding UE is a vehicle UE and has N RUs. That is, this means that an identifier that can identify individual RUs belonging to a vehicle UE is required between the eNB and the UE in addition to UE-ID (e.g., C-RNTI) given to a single UE, which is a vehicle.

First Embodiment

In the first embodiment of the present invention, the eNB may consider the following method 1) or 2) for identification of UE and RU in a cell for a vehicle distributed antenna UE unlike the case that the eNB gives UE-ID (e.g., C-RNTI) to identify a UE in a cell through a random access procedure in the legacy LTE system.

1) UE-ID (e.g., C-RNTI) may be given to the vehicle UE independently. However, in this case, in additional to UE-ID, virtual RU-ID for identifying RUs in the vehicle UE may be given additionally.

2) Otherwise, the eNB may regard individual RUs as independent UEs and give UE-ID (e.g., C-RNTI-Vehicle) for each UE.

With regard to a vehicle distributed antenna UE, an embodiment of UE-ID and an initial access procedure will be described in detail with reference to the drawings.

FIG. 10 is a diagram illustrating a status that a vehicle distributed antenna UE performs an initial access procedure in accordance with the first embodiment of the present invention. Particularly, in FIG. 10, it is noted that RU1 to RU4 are implemented in the vehicle distributed antenna UE, and RU1 and RU2 are configured by group 1. Also, it is noted that RU3 and RU4 are configured by group 2.

In this case, it is assumed that the UE attempts to access cell 1 through group 1 and access cell 2 through group 2.

Figure 11:
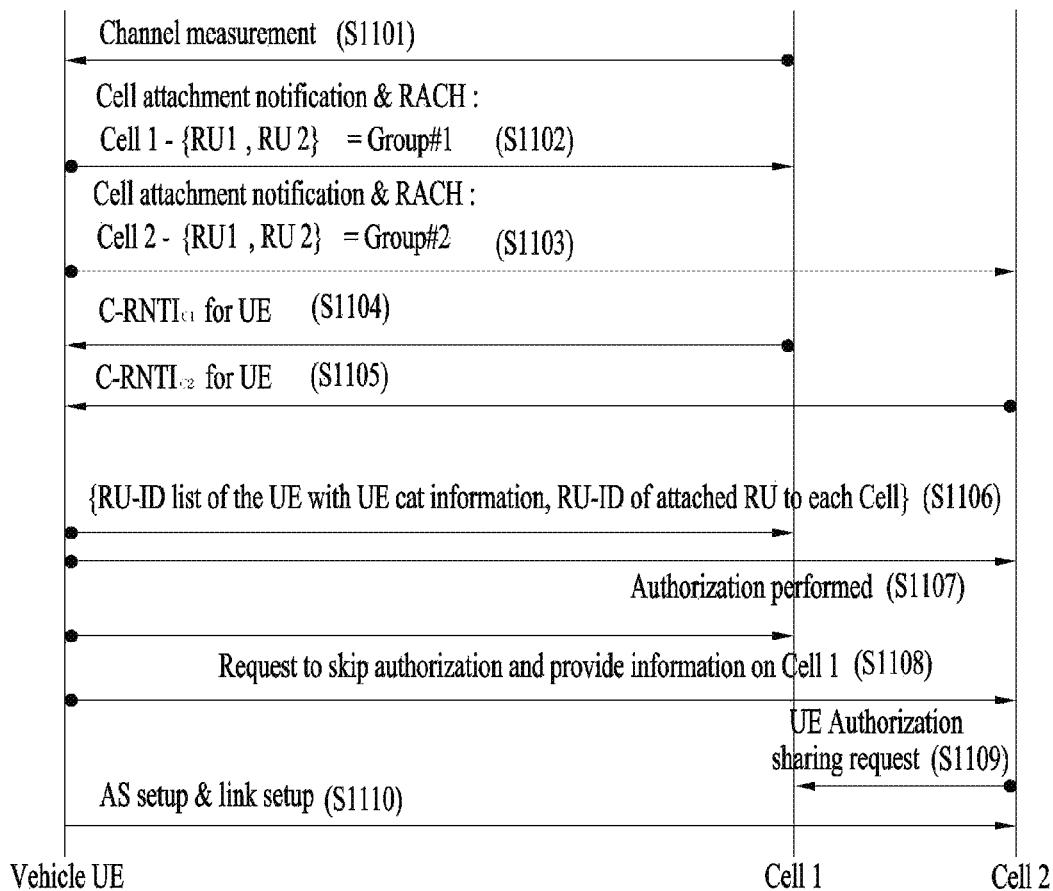
FIG. 11 is a flow chart illustrating an example that a vehicle UE performs initial access in accordance with the first embodiment of the present invention.

FIG. 11 is a flow chart illustrating an example that a vehicle UE performs initial access in accordance with the first embodiment of the present invention.

Referring to FIG. 11, in step 1101, the vehicle UE determines a cell accessed by individual RUs in a UE through long-term channel measurement such as Radio resource Management (RRM), and each RU performs a random access procedure for the cell accessed by each RU. For example, if RU 1 and RU2 in the vehicle UE having four RUs determine to access cell 1 and RU3 and RU4 determine to access cell 2, the vehicle UE performs eNB access for RU1 and RU2 of the vehicle UE by performing a random access procedure through some RUs which will access the cell 1 in step S1102. In step 1103, with respect to RU3 and RU4 which will access the cell 2, the vehicle UE sequentially performs access through a random access procedure for the cell 2.

After a random access procedure for each cell is performed, each cell gives UE-ID such as C-RNTI to the vehicle UE in step 1104 and step 1105. Subsequently, in step 1106, the UE signals, to each cell, RU-ID list comprising a UE category for all RUs included therein and information on RU-ID which has accessed a corresponding cell.

Meanwhile, the cell 1 which has first (or preferentially) received RACH normally performs network authentication for the corresponding vehicle UE in step 1107. Also, in step 1108, the UE requests eNBs (cell 2 in the above example), which have received RACH in the second order or less, of network authentication skip and at the same time signals information on eNB, which may share network authentication information, that is, information on the cell 1 that is the eNB of the first order.

In this case, the UE requests the cell 1, which is the eNB of the first order, of network authentication information in step 1109, the cell 2 may transmit data immediately after access stratum (AS) layer setup and link setup without additional network authentication procedure in step 1110 by receiving the network authentication information in step 1110, and the vehicle distributed MIMO antenna UE may prepare for communication with the eNB.

Meanwhile, if signals between RUs are aggregated at RF level of the vehicle UE as shown in (a) of FIG. 9, the eNB does not need to identify a plurality of RUs despite that the vehicle UE has the plurality of RUs, and it is sufficient that UE-ID such as C-RNTI is given to the vehicle UE like the legacy UE as described in the above method 1).

However, if a physical layer operation occurs individually per RU as shown in (b) and (c) of FIG. 9, RU identifier is required between the eNB and the UE to enable identification of individual RUs in the vehicle. In this case, the aforementioned methods 1) and 2) may be considered, and particularly, the method 1) is to use the category of the legacy LTE UE, and is the method for giving additional ID (e.g., RU-ID), which can identify RUs in the vehicle, in accordance with an agreement between the eNB and the UE in addition to UE-ID given by the eNB to the individual UE-ID which is the vehicle UE. At this time, the following methods a) and b) for giving RU-ID may be considered.

a) Some of bits for expressing UE-ID may be used to express RU-ID. In this case, a total of UE-ID bits are constant. For example, in C-RNTI of 16 bits defined in the LTE system, C-RNTI of 12 bits is an identifier for expressing an independent vehicle UE and the other 4 bits are used as an identifier for RU identification in the vehicle UE but a total of bits are fixed to 16 bits.

b) Bits for expressing RU-ID, for example, tail-bits are added to the bits for expressing UE-ID. Although the bits may be difficult for compatibility with control information delivery operation for the legacy UE, it is advantageous in that the UE identifier such as C-RNTI given to the eNB may be used as it is.

Meanwhile, the individual RU may be regarded as each UE in the same manner as the aforementioned method 2), whereby each eNB may give UE-ID (e.g., C-RNTI). This method should be considered because application of the method 1) is not possible in case of the UE-DAS in which individual RUs in the vehicle UE access different cells. Since C-RNTI is an identifier for allowing the eNB to identify UE in the same cell, the same C-RNTI cannot be given to the same UE if respective RUs of the same UE intend to access different eNBs.

However, the method 2) is not applicable to only the embodiment of the VE-DAS. Even though all RUs which belong to the vehicle UE access the same cell, the eNB gives different C-RNTIs to all RUs like the individual UEs, and if the eNB receives information indicating that the corresponding UE is a distributed antenna vehicle and information indicating that the corresponding UE includes N RUs, together with UE-ID during a random access procedure, the eNB may be allowed to know that each C-RNTI given to each RU is an identifier given to one vehicle UE.

Second Embodiment

Based on the aforementioned discussion, the second embodiment of the present invention suggests a control information encoding/indicating method according to ID given by an eNB for a vehicle distributed antenna UE.

In the LTE system, C-RNTI given to the UE by the eNB has been used for CRC scrambling for PDCCH to encode uplink/downlink control information. However, if an individual physical layer operation of RU is required as shown in (b) and (c) of FIG. 9, the eNB should transmit individual uplink/downlink control information to each RU.

A method for configuring and encoding control information on individual RU by using UE-ID (e.g., C-RNTI) and RU-ID in accordance with configuration of control information is as follows. However, even though signals between RUs are aggregated at RF level of the vehicle UE as shown in (a) of FIG. 9, the following schemes may be applied on the assumption of a general UE having one RU.

Configuration (A)—RU-Aggregated Control Information

In configuration (A) which is RU-aggregated control information, control information of all RUs is aggregated for one vehicle UE and thus one control information is provided to the UE.

Figure 12:
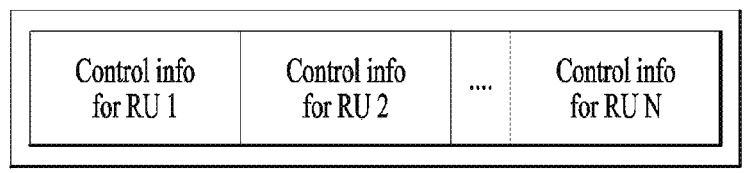
FIGS. 12 and 13 illustrate configuration of RU aggregated control information according to the second embodiment of the present invention.
Figure 13:
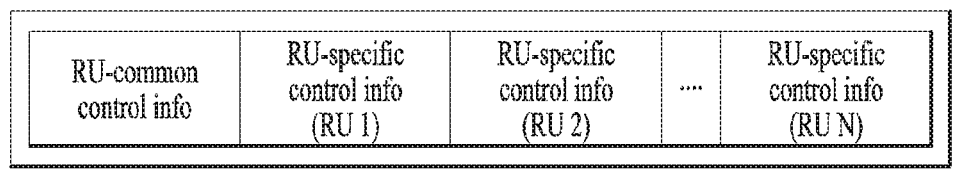

FIGS. 12 and 13 illustrate configuration of RU aggregated control information according to the second embodiment of the present invention.

FIG. 12 is an example that control information for all RUs is simply aggregated, and FIG. 13 illustrates that common control information for all RUs and control information fields of individual RUs are configured divisionally, wherein lengths of the control information may be constant or different. At this time, the control information may be encoded by UE-ID (e.g., C-RNTI) of the vehicle UE, and each RU may decode the uplink/downlink control information through UE-ID and discover a resource region containing its control information based on per-RU allocation information on a control information resource region previously scheduled between the eNB and the UE.

Meanwhile, the control information configurations shown in FIGS. 12 and 13 may be used together in the network, and if total bits of the two control information configurations are equal to each other, a 1-bit flag for expressing which one of the two control information configuration methods has been used may be included, whereby a plurality of formats may not be required to be defined in accordance with control information configuration.

Configuration (B)—RU-Individual Control Information

Figure 14:
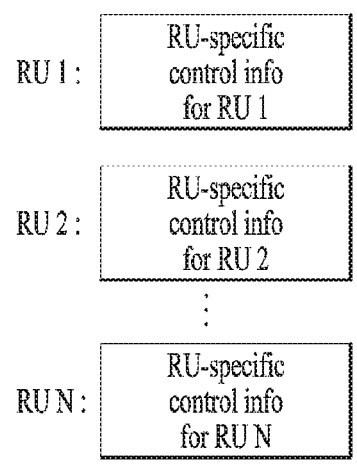
FIG. 14 illustrates configuration of RU individual control information according to the second embodiment of the present invention.

FIG. 14 illustrates configuration of RU individual control information according to the second embodiment of the present invention.

Referring to FIG. 14, in configuration (B) which is RU individual control information, with respect to one vehicle UE, control information of N individual RUs is provided to each of N RUs. In this case, various control information encoding methods may be considered in accordance with UE and RU ID allocation methods suggested in the method 1) of the first embodiment.

First of all, if UE-ID (e.g., C-RNTI) is given to the vehicle UE independently, per-RU control information cannot be identified by configuration of the RU individual control information.

If virtual RU-ID for identifying RUs in the vehicle UE is additionally given as described in the method 1) of the first embodiment in addition to UE-ID, the eNB may encode the control information in accordance with two methods and transmit the encoded control information to the individual RUs of the vehicle UE. First of all, the eNB may encode the control information of each RU by using a sequence generated complexly considering RU-ID together with f(C-RNTI, RU-ID) without encoding the control information using UE-ID (C-RNTI) only like the legacy case. This method is applicable to the example of FIG. 14.

Figure 15:
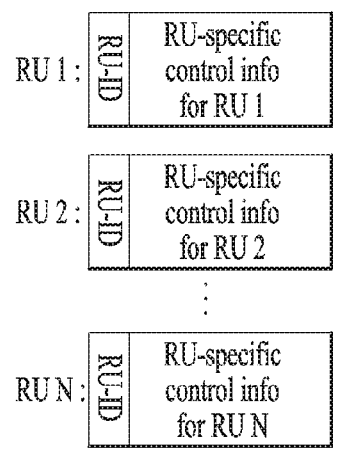
FIG. 15 illustrates an example that control information of each RU is added to a header field for RU-ID in accordance with the second embodiment of the present invention.

Secondly, the eNB may encode control information of each RU by using UE-ID (C-RNTI) equally to the legacy LTE system, and may add a header field for RU-ID to the control information so as to allow each RU to identify its control information based on RU-ID. This is applicable to the example of FIG. 15. FIG. 15 illustrates an example that control information of each RU is added to a header field for RU-ID in accordance with the second embodiment of the present invention.

If the method 2) of the first embodiment is applied, the eNB may encode the control information for each RU by using per-RU-UE-ID (e.g., C-RNTI-Vehicle) given by itself and provide the encoded control information. This is to apply C-RNTI-Vehicle not C-RNTI to CRC scrambling in the example of FIG. 14.

Meanwhile, the configuration (A) and the configuration (B) of the control information may be used together for one UE. An example of multi-cell access using the VE-DAS will be described with reference to FIG. 16.

Figure 16:
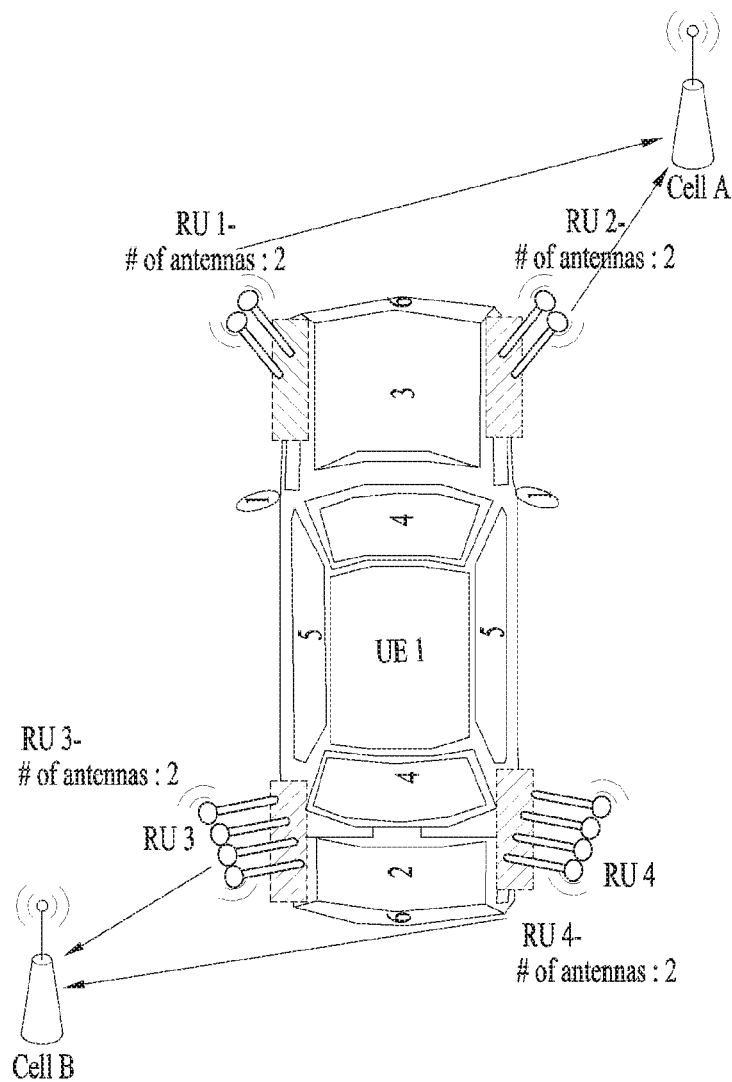
FIG. 16 illustrates an example of multi-cell access using a UE-DAS.

As shown in FIG. 16, when some RU(s) in one UE access cell A and the other RU(s) access cell B, RU #1 and RU #2 which have accessed the same cell may have the same C-RNTI, and RU #3 and RU #4 may have the same C-RNTI.

On the other hand, since RU #1, RU #3 and RU #4 access a cell different from a cell accessed by RU #2, RU #3 and RU #4, it may be difficult to have the same C-RNTI.

Therefore, with respect to control information of a plurality of RUs which belong to a single UE, RUs which have accessed the same cell may be combined by C-RNTI encoding based RU-aggregated control information configuration, and information of RUs which belong to different cells may be combined by RU individual control information configuration, whereby the control information may be transmitted to the vehicle UE.

Figure 17:
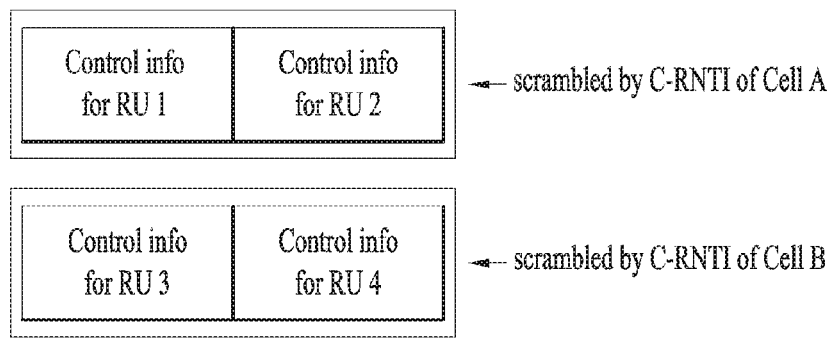
FIG. 17 illustrates a complex configuration example of RU aggregated control information and RU individual control information according to the second embodiment of the present invention.

FIG. 17 illustrates a complex configuration example of RU aggregated control information and RU individual control information according to the second embodiment of the present invention.

Referring to FIG. 17, control information is configured for [RU1, RU2], which have accessed cell A, by C-RNTI encoding based RU aggregated control information configuration. Likewise, control information is configured for [RU3, RU4], which have accessed cell B, by C-RNTI encoding based RU aggregated control information configuration. Also, since combination of [RU1, RU2] and combination of [RU3, RU4] are RU combinations which belong to different cells, this is configured by RU individual control information configuration.

The present invention has been described based on, but not limited to, distributed antenna based vehicle communication, and may equally be applied to a general MIMO antenna system.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

Detailed explanation on the preferred embodiment of the present invention disclosed as mentioned in the foregoing description is provided for those in the art to implement and execute the present invention. While the present invention has been described and illustrated herein with reference to the preferred embodiments thereof, it will be apparent to those skilled in the art that various modifications and variations can be made therein without departing from the spirit and scope of the invention. For instance, those skilled in the art can use each component described in the aforementioned embodiments in a manner of combining it with each other. Hence, the present invention may be non-limited to the aforementioned embodiments of the present invention and intends to provide a scope matched with principles and new characteristics disclosed in the present invention.

INDUSTRIAL APPLICABILITY

Although the method for allocating a UE identifier in a distributed antenna communication system and the device for the same have been described based on the 3GPP LTE system, the method and the device are applicable to various wireless communication systems in addition to the 3GPP LTE system.

What is claimed is:

1. A method transmitting and receiving a signal by a user equipment (UE) having a plurality of vehicle distributed antenna units in a wireless communication system, the method comprising:
performing a first random access procedure with a first cell based on a first vehicle distributed antenna unit group of the plurality of vehicle distributed antenna units;
performing a second random access procedure with a second cell based on a second vehicle distributed antenna unit group of the plurality of vehicle distributed antenna units;
receiving a first UE identifier for the first vehicle distributed antenna unit group from the first cell;
receiving a second UE identifier for the second vehicle distributed antenna unit group from the second cell;
transmitting, to the first cell, first information related to the vehicle distributed antenna units included in the first vehicle distributed antenna unit group;
transmitting, to the second cell, second information related to the vehicle distributed antenna units included in the second vehicle distributed antenna unit group;
performing an authentication procedure with the first cell based on the first vehicle distributed antenna unit group;
transmitting an authentication procedure skip request signal to the second cell based on the second vehicle distributed antenna unit group; and
transmitting and receiving the signal with the first cell and the second cell based on the first vehicle distributed antenna unit group and the second vehicle distributed antenna unit group,
wherein the first UE identifier includes a UE identifier and a first remote unit (RU) identifier for the first vehicle distributed antenna unit group, and
wherein the second UE identifier includes the UE identifier and a second RU identifier for the second vehicle distributed antenna unit group.

2. The method of claim 1, wherein the authentication procedure skip request signal includes a sharing request signal of authentication performed with the first cell.

3. The method of claim 1, wherein the first information and the second information include identification information of the vehicle distributed antenna units.

4. The method of claim 1, further comprising:
performing radio resource measurement; and
selecting the first vehicle distributed antenna unit group for accessing the first cell and the second vehicle distributed antenna unit group for accessing the second cell from the plurality of vehicle distributed antenna units based on the result of the radio resource measurement.

5. A user equipment (UE) in a wireless communication system, the UE comprising:
a plurality of vehicle distributed antenna units; and
a central unit for controlling the vehicle distributed antenna units,
wherein the central unit is configured to:
perform a first random access procedure with a first cell based on a first vehicle distributed antenna unit group of the plurality of vehicle distributed antenna units;
perform a second random access procedure with a second cell based on a second vehicle distributed antenna unit group of the plurality of vehicle distributed antenna units;
receive a first UE identifier for the first vehicle distributed antenna unit group from the first cell;
receive a second UE identifier for the second vehicle distributed antenna unit group from the second cell;
transmit, to the first cell, first information related to the vehicle distributed antenna units included in the first vehicle distributed antenna unit group;
transmit, to the second cell, second information related to the vehicle distributed antenna units included in the second vehicle distributed antenna unit group;
perform an authentication procedure with the first cell based on the first vehicle distributed antenna unit group;
transmit an authentication procedure skip request signal to the second cell based on the second vehicle distributed antenna unit group; and
transmit and receive a signal with the first cell and the second cell based on the first vehicle distributed antenna unit group and the second vehicle distributed antenna unit group,
wherein the first UE identifier includes a UE identifier and a first remote unit (RU) identifier for the first vehicle distributed antenna unit group, and
wherein the second UE identifier includes the UE identifier and a second RU identifier for the second vehicle distributed antenna unit group.

6. The UE of claim 5, wherein the authentication procedure skip request signal includes a sharing request signal of authentication performed with the first cell.

7. The UE of claim 5, wherein the first information and the second information include identification information of the vehicle distributed antenna units.

8. The UE of claim 5, wherein the central unit is further configured to select the first vehicle distributed antenna unit group for accessing the first cell and the second vehicle distributed antenna unit group for accessing the second cell from the plurality of vehicle distributed antenna units, based on a result of radio resource measurement.

\* \* \* \* \*